United States Patent [19]

Schechter

[11] Patent Number: 5,404,844
[45] Date of Patent: Apr. 11, 1995

[54] PART LOAD GAS EXCHANGE STRATEGY FOR AN ENGINE WITH VARIABLE LIFT CAMLESS VALVETRAIN

[75] Inventor: Michael M. Schechter, Farmington Hills, Mich.

[73] Assignee: Ford Motor Company, Dearborn, Mich.

[21] Appl. No.: 286,312

[22] Filed: Aug. 5, 1994

Related U.S. Application Data

[62] Division of Ser. No. 173,009, Dec. 27, 1993, Pat. No. 5,367,990.

[51] Int. Cl.6 ............................ F01L 9/02; F02G 5/00
[52] U.S. Cl. ................................ 123/90.12; 123/90.15; 123/556; 123/568
[58] Field of Search ............ 123/90.11, 90.12, 90.13, 123/90.15, 556, 568

[56] References Cited

U.S. PATENT DOCUMENTS

| | | | |
|---|---|---|---|
| 4,096,697 | 6/1978 | Treuil | 123/556 |
| 5,027,753 | 7/1991 | Hamazaki et al. | 123/90.15 |
| 5,231,959 | 8/1993 | Smietana | 123/90.12 |
| 5,255,641 | 10/1993 | Schechter | 123/90.12 |
| 5,275,136 | 1/1994 | Schechter et al. | 123/90.12 |
| 5,293,741 | 3/1994 | Kashiyama et al. | 123/90.15 |

Primary Examiner—Andrew M. Dolinar
Assistant Examiner—Weilun Lo
Attorney, Agent, or Firm—Donald W. Wilkinson; Roger L. May

[57] ABSTRACT

A variable engine valve control system and method of operation thereof wherein each of the reciprocating engine valves is hydraulically or electrically controlled and can vary its lift schedule for various engine operating conditions. During part load operation of the engine, the intake valve is opened and the exhaust valve is closed during the exhaust stroke, prior to a piston's top dead center position, so that the intake port receives exhaust gas, which is then returned to the cylinder during the intake stroke to eliminate the need for an external exhaust gas recirculation system and to improve fuel evaporation into the intake air. Further, during part load, the intake valve is closed before the end of the intake stroke and the intake air is heated by a heat exchanger prior to entry into the cylinder to eliminate the need for air throttling without compromising the compression ratio and ignition characteristics.

2 Claims, 2 Drawing Sheets

PART LOAD GAS EXCHANGE STRATEGY FOR AN ENGINE WITH VARIABLE LIFT CAMLESS VALVETRAIN This is a divisional of application Ser. No. 08/173,009, filed Dec. 27, 1993, now U.S. Pat. No. 5,367,990.

FIELD OF THE INVENTION

The present invention relates to systems and methods of operation thereof for variably controlling internal combustion engine intake and exhaust valves. More specifically, it relates to camless engine valve systems and methods of operation in engines used to eliminate the need for external exhaust gas recirculation and air throttling.

BACKGROUND OF THE INVENTION

Conventional automotive internal combustion engines operate with one or more camshafts controlling the timing and lift of the intake and exhaust valves, according to a predetermined lift schedule. With this type of mechanical structure, the lift schedule is fixed. However, under different engine operating conditions, the optimum lift schedule varies. Thus, the lift schedule must be a compromise of the optimum lift schedule needed for the different operating conditions. To accommodate full throttle engine operation, which requires significant air intake, an aggressive lift schedule must be used. At part load operating conditions, however, the intake air must then be throttled to prevent too much air from entering the cylinder. Consequently, this causes parasitic losses due to the throttling.

It is desirable to eliminate throttling losses by eliminating the need for an air throttle, without losing the effective compression ratio. One possible way to accomplish this is to close the intake valve before piston bottom dead center (BDC) during the intake stroke. However, the gas in the cylinder will then experience expansion during the end of the intake stroke with resultant cooling. Cooling of the gas can be detrimental to engine performance. Therefore, the need arises for a way to maintain the proper temperature of the gas at combustion when it undergoes a cooling due to expansion during the end of the intake stroke. This would improve combustion characteristics and provide better fuel economy.

Further, in internal combustion engines used in vehicles today, some of the exhaust gas is recirculated, by an external exhaust gas recirculation (EGR) system, to control the nitrogen oxide formation and to retain the maximum unburned hydrocarbons in the cylinder and allow for hotter intake gas for better evaporation of fuel. It is desired to eliminate the need for an external EGR system to reduce the cost and complexity that yields increased maintenance requirements. Additionally, for environmental reasons, it is desired to maintain as much of the unburned hydrocarbons in the cylinder as possible rather than allowing them to flow out in the exhaust.

It is understood that the distribution of unburned hydrocarbons in the cylinder charge at the beginning of the exhaust stroke is uneven. A substantial part of the unburned hydrocarbons that come out of the piston ring crevices at the end of the expansion stroke remain concentrated in the bottom part of the cylinder near the piston. If this part of the cylinder charge can be prevented from being discharged into the exhaust port, a substantial reduction in hydrocarbon emissions can be achieved. Thus, in order to maintain the greatest amount of unburned hydrocarbons within the cylinder, it is desired that the part of the exhaust charge with the highest concentration of unburned hydrocarbons be prevented from flowing out through the exhaust port. Furthermore, if some hot gas can temporarily reside in the intake port, it will increase the intake air temperature, which promotes better evaporation of fuel injected into the port, especially during engine cold start and warm-up. This, too, improves hydrocarbon emissions.

The enhancement of engine performance attainable by varying the acceleration, velocity and travel time of the intake and exhaust valves in an engine is well known and appreciated in the art. The increasing use and reliance on microprocessor control systems for automotive vehicles and increasing confidence in hydraulic and electric as opposed to mechanical systems is now making substantial progress possible. The almost limitless flexibility with which the intake and exhaust events (timing strategy) can be varied in an engine with a camless valvetrain can lead to substantial improvements in engine operation.

However, none of the present systems and methods of operation provide a variable engine valve control system that substitutes for the external EGR system in today's engines to reduce harmful emissions by returning a portion of unburned hydrocarbons back to the cylinder while at the same time promoting better evaporation of fuel, while also eliminating air throttling losses without reducing the effective compression ratio and while avoiding problems caused by low air temperature resulting from early intake valve closure. The present system optimizes engine performance, especially at part load engine operation.

SUMMARY OF THE INVENTION

In its embodiments, the present invention contemplates an electrohydraulically operated valve control system cooperating with a piston and cylinder in an internal combustion engine. The valve control system includes an intake port, coupled to the cylinder, having an intake valve operatively associated therewith, with the intake valve selectively closable before and after piston bottom dead center, and an exhaust port, coupled to the cylinder, having an exhaust valve operatively associated therewith. The valve control system further includes a heat exchanger having a heat exchange mechanism, an exhaust gas inlet and an exhaust gas outlet, and an intake air inlet and an intake air outlet, with the exhaust inlet being coupled to the exhaust port and coupled through the heat exchange mechanism to the exhaust outlet. The intake outlet is coupled to the intake port and is selectively coupled to an intake inlet though the heat exchange mechanism and around the heat exchange mechanism. The heat exchanger further has a means for selectively routing intake air through the heat exchange mechanism whereby the amount of intake inlet air that passes through the heat exchange mechanism is a function of the closing of the intake valve relative to the piston's bottom dead center position.

The present invention further contemplates a method of operating an engine valve control system in an internal combustion engine. The method includes the steps of opening an intake valve of a cylinder, selectively heating ambient intake air prior to entry into the engine cylinder, and closing the intake valve prior to a piston's bottom dead center position during an intake stroke within the cylinder whereby the intake air will be at an ambient temperature when the piston reaches a position of bottom dead center.

Accordingly, an object of the present invention is to provide a camless valvetrain system capable of eliminating the need for intake air throttling while still maintaining the effective compression ratio and adequate ignition characteristics.

It is a further object of the present invention to achieve the above noted object of the present invention and further to eliminate the need for an external EGR system by returning the portion of exhaust gas in the cylinder with the highest concentration of unburned hydrocarbons to the intake port during the exhaust stroke.

It is an advantage of the present invention that the need for air throttling will be eliminated without reducing the effective compression ratio and without adversely affecting ignition characteristics.

It is a further advantage of the present invention that nitrogen oxide and hydrocarbon emissions will be reduced while eliminating the need for an external EGR system and allowing for better fuel evaporation.

DETAILED DESCRIPTION OF THE PREFERRED EMBODIMENTS

Figure 1:
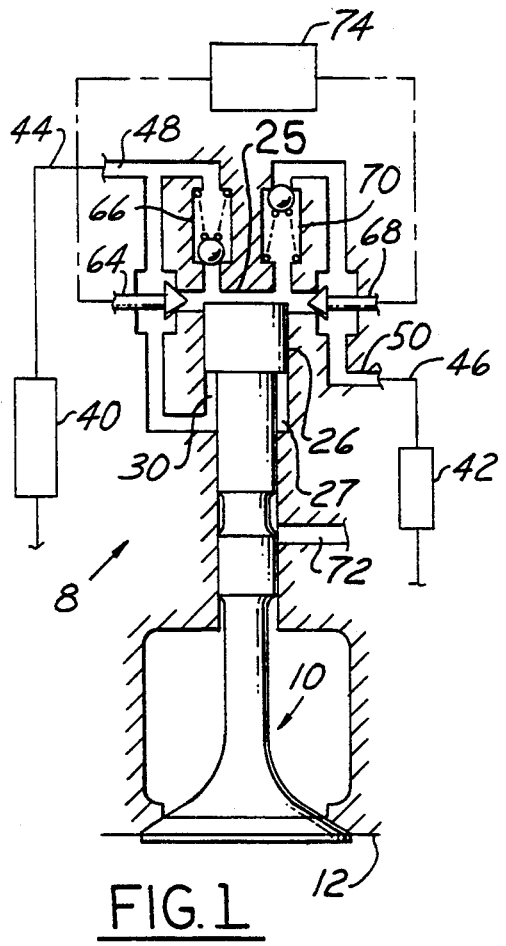
FIG. 1 is a schematic diagram showing a single valve assembly of an electrohydraulic camless valvetrain in accordance with the present invention.

FIG. 1 shows a single engine valve assembly 8 that forms part of a valvetrain controlled by a electrohydraulic camless valve system (not shown). While this figure is the preferred embodiment for the valvetrain, other hydraulic and electrical systems can also be used to variably control engine valves. An electrohydraulic valvetrain is shown in detail in U.S. Pat. No. 5,255,641 to Schechter, which is incorporated herein by reference.

A single engine valve assembly 8 of an electrohydraulically controlled valvetrain is shown in FIG. 1. An engine valve 10, for inlet air or exhaust as the case may be, is located within a cylinder head 12. A valve piston 26, fixed to the top of the engine valve 10, is slidable within the limits of a piston chamber 30.

Fluid is selectively supplied to volume 25 above piston 26 from a high pressure oil source 40 and a low pressure oil source 42 hydraulically connected through a high pressure line 44 and a low pressure line 46, respectively, to a high pressure port 48 and a low pressure port 50, respectively.

Volume 25 can be connected to high pressure oil source 40 through a solenoid valve 64 or a check valve 66, or no low pressure oil source 42 through a solenoid valve 68 or a check valve 70. A volume 27 below piston 26 is always connected to high pressure oil source 40. A fluid return outlet 72 provides a means for returning to a sump (not shown) any fluid that leaks out of piston chamber 30. High pressure solenoid valve 64 and low pressure solenoid valve 68 are activated and deactivated by signals from a microprocessor controller 74.

Engine valve opening is controlled by high-pressure solenoid valve 64 which opens, causing valve acceleration, and closes, causing deceleration. Opening and closing of low pressure solenoid valve 68 controls engine valve closing.

During engine valve opening, high pressure solenoid valve 64 opens and the net pressure force acting on piston 26 accelerates engine valve 10 downward. When high pressure solenoid valve 64 closes, pressure above piston 26 drops, and piston 26 decelerates pushing the fluid from volume 27 below it back into high pressure oil source 40. Low pressure fluid flowing through low pressure check valve 70 prevents void formation in volume 25 during deceleration. When the downward motion of engine valve 10 stops, low pressure check valve 70 closes and engine valve 10 remains locked in its open position.

The process of valve closing is similar, in principle, to that of valve opening. Low pressure solenoid valve 68 opens, the pressure above piston 26 drops and the net pressure force acting on piston 26 accelerates engine valve 10 upward. When low pressure solenoid valve 68 closes, pressure above piston 26 rises, and piston 26 decelerates pushing the fluid from volume 25 through high-pressure check valve 66 back into high-pressure oil source 40.

The flexibility with which the timing and lift of intake and exhaust valves can be continuously varied allows great flexibility in optimizing engine performance for many different engine operating conditions, including part load engine operating conditions.

FIGS. 2, 3A, 3B, and 3C show variable valve timing in which early intake valve opening and exhaust valve closing aids engine operation for certain engine operating conditions by eliminating the need for an external EGR system. The variable timing for closing 101 of an exhaust valve 100 and opening 103 of an intake valve 102 in a cylinder 112 is shown such that, at part-load, closing 101 and opening 103, respectively, takes place substantially in advance of a piston 110 reaching top dead center (TDC) 104 so that the exhaust charge is split into two parts. Exhaust valve 100 and intake valve 102 are preferably each electrohydraulically controlled in the same manner as engine valve 10 shown in FIG. 1, although other camless engine valve systems can also be used.

Figure 3A:
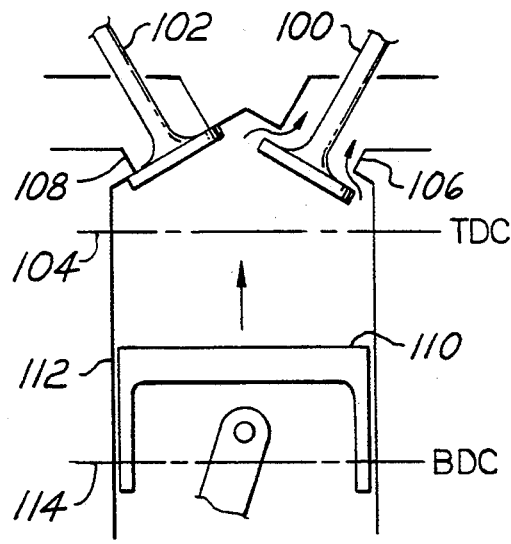
FIGS. 3A and 3B show a schematic diagram of an engine cylinder and engine valves in two stages of an exhaust stroke in accordance with the present invention.
Figure 3B:
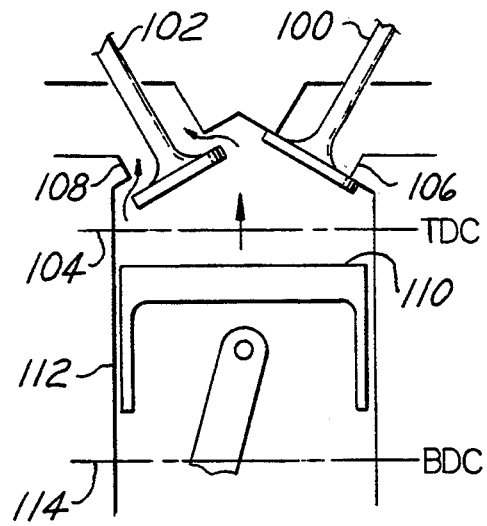

As a result of the timing of the valve closings and openings, a first part of the exhaust gasses, comprising the upper part of the cylinder content, is expelled into an exhaust port 106 during the first portion of the exhaust stroke, as shown in FIG. 3A. A second part of the exhaust gasses, comprising the lower part of the cylinder content, is expelled into an intake port 108, as shown in FIG. 3B. The second part will contain a higher concentration of unburned hydrocarbons than the first part since a substantial portion of the unburned hydrocarbons are concentrated in the bottom part of the cylinder 112.

Figure 3C:
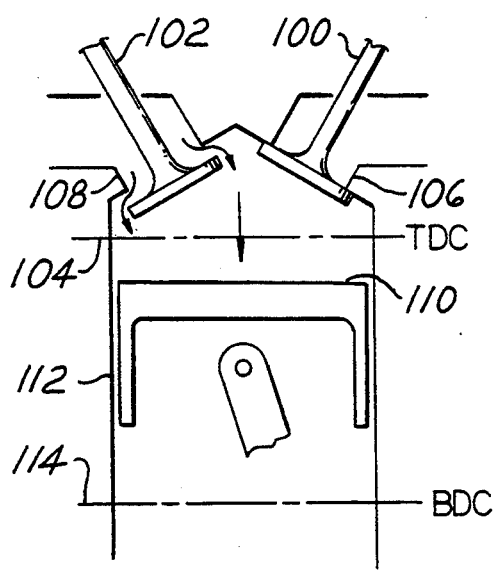
FIGS. 3C and 3D show a schematic diagram of an engine cylinder and engine valves in two stages of an intake stroke in accordance with the present invention.

When piston 110 begins its intake stroke, the gas previously expelled into intake port 108 returns to cylinder 112 as part of the intake charge, as shown in FIG. 3C. This assures that a substantial amount of the unburned hydrocarbons produced during each cycle will be introduced back into cylinder 112 from intake port 108 and can then participate in the next combustion cycle. The quantity of the exhaust gas thus retained in the cylinder can be controlled by varying the timing of exhaust valve closing 101 and intake valve opening 103. The second part of exhaust charge returned to the cylinder restricts the quantity of nitrogen oxide produced in the next cycle, thus reducing harmful emissions and eliminating the need for an external EGR system.

As an additional benefit, the temporary residence of the second part of the exhaust charge in intake port 108 preceding each intake stroke will also promote better evaporation of the fuel injected into port 108 due to the high temperature of the gas. This is especially beneficial during engine cold start and during engine warm-up.

As an alternative, it should be noted that retention of some of the exhaust gas in cylinder 112 in the gas splitting strategy can also be accomplished by delaying exhaust valve closing significantly past TDC 104. In this case, practically the entire exhaust charge is expelled into exhaust port 106, and some of it returns to cylinder 112 at the beginning of the intake stroke. There is, however, no assurance that the gas that returns represents what was previously in the lower part of cylinder 112, and, hence that the highest concentration of unburned hydrocarbons is maintained in cylinder 112.

Figure 2:
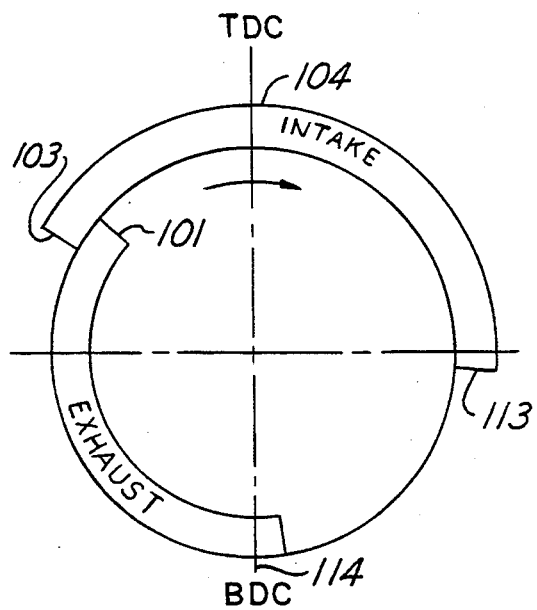
FIG. 2 is a circular diagram illustrating the duration and timing of intake and exhaust events of engine valves in accordance with the present invention.
Figure 3D:
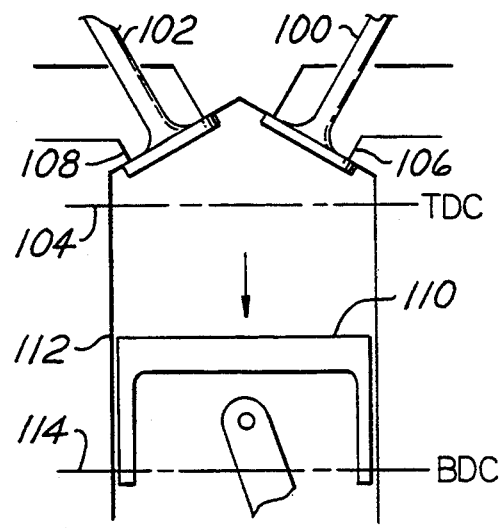

FIGS. 2, 3C, and 3D show intake valve closing 113 in which the variable timing of closing 113 is such that, at part-load, intake valve closing 113 takes place substantially before piston bottom dead center (BDC) 114, trapping a variable volume of intake air in cylinder 112 initially at approximately barometric pressure. This facilitates unthrottled engine operation at part load, eliminating the need for intake air throttling. To restrict the quantity of air inducted into cylinder 112, intake valve 102 is closed far in advance of BDC 114, thus reducing the volume of the trapped intake charge. The mixture of intake air, fuel and exhaust gas that was inducted at near barometric pressure will then be subjected to expansion during the remainder of the intake stroke. The intake air expansion after intake valve closure will cause an associated cooling. The drop in intake charge temperature associated with its expansion may lead to excessively low temperature at the end of the compression stroke, which can be deleterious to the combustion process.

To prevent this, the intake air can be heated. One way to accomplish this heating is through heat exchange with the exhaust gas. The intake air, then, is subjected to heating in advance of its induction into cylinder 112. This heating of intake air will assure that, after the expansion caused cooling in the cylinder, the temperature of the intake charge is approximately equal to the ambient temperature of the air before the expansion.

Figure 4:
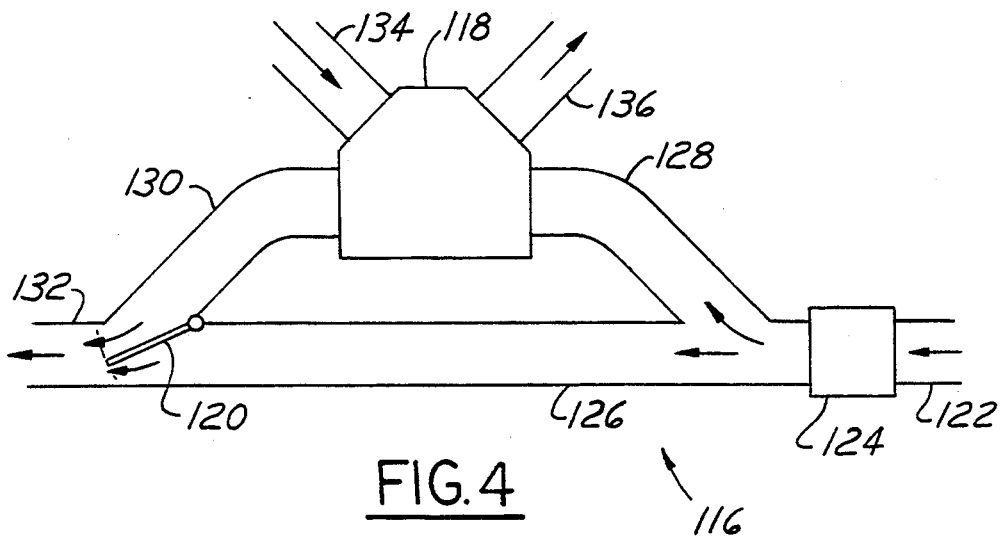
FIG. 4 is a schematic diagram of an intake air heat exchanger in accordance with the present invention.

FIG. 4 illustrates a heat exchanger 116 that selectively preheats the intake air prior to entering intake port 108. Heat exchanger 116 includes intake inlet 122 for receiving ambient air, with a mass air flow sensor 124 mounted at inlet 122. Mass air flow sensor 124 monitors the total mass of inlet air flowing into intake inlet 122. Intake inlet 122 divides into a bypass duct 126 and a heat exchange inlet duct 128. The intake air can be routed through a heat exchange mechanism 118 via heat exchange inlet duct 128, where the air temperature is increased. A heat exchange outlet duct 130 connects to the bypass duct 126, which leads to an air intake outlet 132.

Heat exchanger 116 further includes an exhaust gas inlet 134, connected between exhaust port 106 and heat exchange mechanism 118, and an exhaust gas outlet 136 also connected to heat exchange mechanism 118. A directional control valve 120 can be rotated to vary the percentage of the total mass air flow that is directed through the heat exchanger from 0 to 100%, and, in this way, control the temperature of the air inducted into cylinder 112.

Air flowing through heat exchange mechanism 118 is heated so that, after expansion, the temperature of the intake charge is not below the ambient temperature. Thus, the heating of the air before induction into cylinder 112 cancels the cooling effect of expansion, so that at the start of the compression stroke, the gas in cylinder 112 is below atmospheric pressure but at approximately ambient atmospheric temperature. These are the same conditions that would prevail in cylinder 112 at this point in the cycle if the intake air was throttled, except that there was no throttling and consequently, no pumping loss.

During the subsequent compression stroke, the intake charge is subjected to full compression determined by the geometric compression ratio. Since the effect of expansion cooling was cancelled out by the air heating, the charge expansion during the intake stroke has no detrimental affect on the rest of the cycle.

As an alternative to early intake valve closure, it should be noted that the air flow control at part-load can also be accomplished by closing intake valve 102 late after BDC 114 rather than before BDC. The effect of reduced effective compression ratio can still be alleviated by air heating, but the loss of heat to cylinder walls can be substantial. Thus, early intake valve closing is the preferred arrangement.

While certain embodiments of the present invention have been described in detail, those familiar with the art to which this invention relates will recognize various alternative designs and embodiments for practicing the invention as defined by the following claims.

I claim:

1. A hydraulically operated valve control system cooperating with a piston and cylinder in an internal combustion engine, the system comprising:

a high pressure source of fluid and a low pressure source of fluid;

a cylinder head member affixed to the engine and including a pair of enclosed bores and corresponding chambers, and an intake port and an exhaust port;

an intake valve coupled to the intake port and an exhaust valve coupled to the exhaust port shiftable between first and second positions, each within their respective cylinder head bore and chamber;

a hydraulic actuator having a two valve pistons, one each coupled to the intake and the exhaust valve and reciprocable within their respective enclosed chambers which thereby forms a first and a second cavity within each chamber, which vary in displacement as the engine valves move;

the cylinder head member having a high pressure port extending between the first and second cavities of each chamber and the high pressure source of fluid, and a low pressure port extending between the first cavity of each chamber and the low pressure source of fluid;

a pair of high pressure valves and a pair of low pressure valves, one high pressure valve and one low pressure valve for respectively regulating the flow of fluid in each of the first cavities;

control means cooperating with the high and low pressure valves for selectively coupling the first cavities to the high pressure and low pressure source to oscillate the intake and exhaust valves in timed relation to engine operation, wherein during each oscillation, some of the high pressure fluid is used to reciprocate the valves is returned to the high pressure source, thereby allowing that the net fluid flow between the high pressure and low pressure sources may be substantially less than the volume swept by the valve pistons; and means for selectively preheating intake air prior to entry into the intake port such that the amount of preheat of the intake air corresponds to the timed relation of the intake valve to engine operation.

2. A valve control system according to claim 1 wherein the intake valve is openable prior to piston top dead center and the exhaust valve is closeable prior to piston top dead center whereby some of the exhaust gas will enter the intake port.

* * * * *